United States Patent [19]

Kessler

[11] 4,111,502
[45] Sep. 5, 1978

[54] AUTOMOBILE TAPE STORAGE CASE

[76] Inventor: Harvey Kessler, 72 Cedar Rd., Westbury, N.Y. 11590

[21] Appl. No.: 717,226

[22] Filed: Aug. 24, 1976

[51] Int. Cl.² .................. A47B 81/06; B65D 39/00
[52] U.S. Cl. ........................... 312/10; 312/12; 312/245; 312/290; 206/387
[58] Field of Search .................... 312/8–12, 312/290, 348; 211/40; 206/387; 220/339

[56] References Cited

U.S. PATENT DOCUMENTS

| | | | |
|---|---|---|---|
| 113,862 | 4/1871 | Duffett | 312/245 |
| 719,334 | 1/1903 | Herron | 312/290 |
| 1,225,499 | 5/1917 | Rosenberg | 312/290 |
| 1,268,141 | 6/1918 | Nystrom | 312/12 |
| 1,774,237 | 8/1930 | Rand, Jr. | 312/348 |
| 2,422,594 | 6/1947 | Stengren | 312/10 |
| 3,603,478 | 9/1971 | Connan | 206/387 |
| 3,677,396 | 7/1972 | Staar | 206/387 |
| 3,836,222 | 9/1974 | Kuntze | 312/10 |
| 3,969,007 | 7/1976 | Lowry | 206/387 |
| 3,977,523 | 8/1976 | Cousino | 206/387 |

Primary Examiner—Kenneth Downey
Assistant Examiner—Victor N. Sakran
Attorney, Agent, or Firm—Nolte and Nolte

[57] ABSTRACT

An automobile tape storage case includes a housing having a base, a pair of upwardly extending end walls, an upwardly extending rear wall, an open top, and an upwardly extending front wall having a plurality of openings therethrough. A plurality of intermediate vertical walls are disposed in the housing thereby forming a plurality of chambers therein, wherein each opening communicates with one of the chambers. A drawer is slideably received into each of the openings, wherein each drawer holds a tape therein.

5 Claims, 2 Drawing Figures

AUTOMOBILE TAPE STORAGE CASE

BACKGROUND OF THE INVENTION

A number of United States patents relate to tape cartridge holders, but these aforementioned patents are non-applicable to my present invention. These patents are: U.S. Pat. Nos. 3,510,008 to Mason; 3,565,282 to Staar; 3,893,585 to Morrison; 3,561,595 to Weggeland; and 3,907,116 to Wolf.

SUMMARY OF THE INVENTION

My present invention relates to a unique and novel automobile tape storage case.

An object of my present invention is to provide an automobile tape storage case of simple design which is adapted to hold a plurality of tape cartridges or cassettes and is readily transferable from one automobile to another, wherein the case is formed from a colored flame retardant plastic.

Briefly, my present invention is a housing having a base, a pair of upwardly extending end walls, an upwardly extending rear wall, an open top, and an upwardly extending front wall having a plurality of openings therethrough. A plurality of intermediate vertical walls are disposed in the housing thereby forming a plurality of chambers therein, wherein each opening communicates with one of the chambers. A drawer is slideably received into each of the openings, wherein each drawer holds a tape cartridge or cassette therein.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
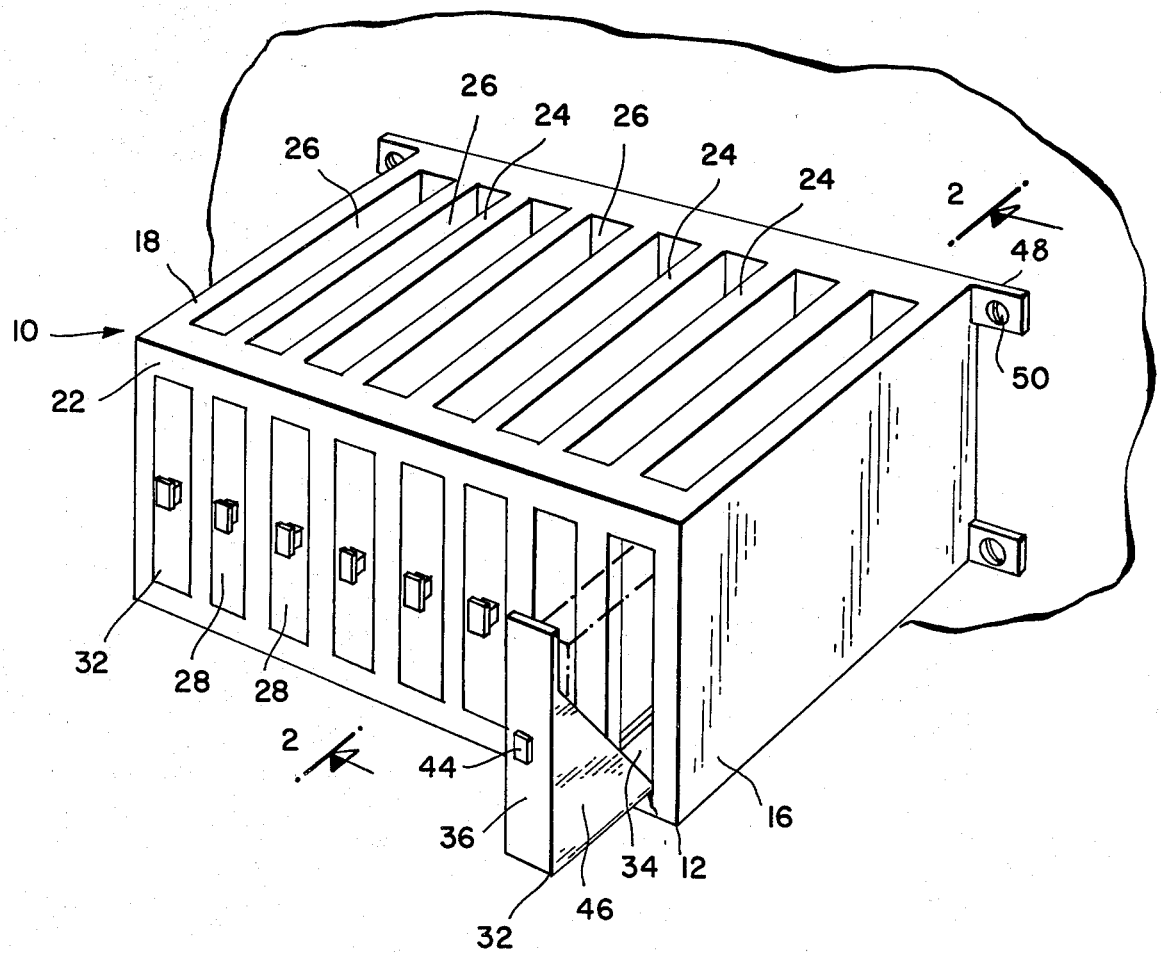
FIG. 1 illustrates a perspective view of an automobile tape storage case.
Figure 2:
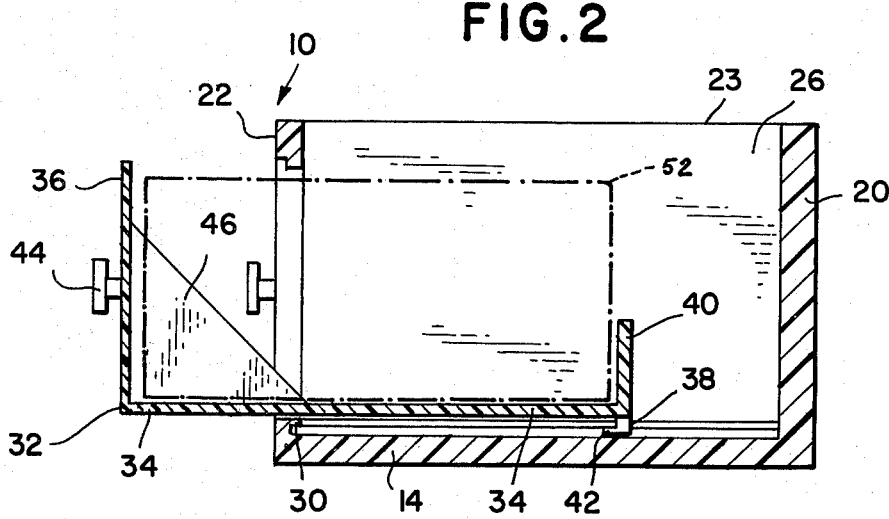
FIG. 2 illustrates a side cross-section view of the device.

Turning now descriptively to the drawings, in which similar reference characters denote similar elements throughout the several views, FIGS. 1 and 2 show an automobile tape storage case 10 which comprises a rectangularly shaped housing 12 having a base 14, a pair of upwardly extending end walls 16, 18, an upwardly extending rear wall 20, an upwardly extending front wall 22, and an open top 23. A plurality of vertically aligned intermediate walls 24 are disposed within the housing 12, wherein each wall 24 extends between the rear 20 and front wall 22 and upwardly to the upper edges of the rear 20 and front wall 22 thereby forming a plurality of vertically aligned chambers 26 within the housing 12. The front wall 22 has a plurality of vertically aligned, rectangularly shaped openings 28 therethrough, wherein each opening 28 communicates with one of the chambers 26. An inwardly extending lip member 30 is affixed to the inner surface of the front wall 22 at the lower ends of the openings 28, wherein lip member 30 extends between the end walls 16, 18. A drawer member 32 is slideably disposed in each chamber 26. Each drawer member 32 comprises a base 34 and a front wall 36 extends perpendicularly upwardly from the forward edge of base 34. An L-shaped rear wall 38 has a longer leg 40 and a shorter leg 42, wherein the rear end of base 34 is perpendicularly joined to an intermediate point of leg 40 such that leg 42 extending forwardly in a parallel plane under base 34. A handle member 44 is affixed to the front surface of each front wall 36 of each drawer member 32. Each drawer member 32 has a pair of triangularly shaped sidewalls 46, wherein each sidewall 46 extends from an intermediate point of wall 36 to an intermediate point of base 34. A tab member 48 having a hole 50 therethrough is mounted to the upper and lower rear corners of each end wall 16, 18 wherein each tab member 48 extends linearly outwardly from the rear wall 20.

In use, the housing 12 is mounted to the automobile by screw means extending through the holes 50 of the tab member 48. A cartridge or cassette 52 is placed in each drawer member 32. Each drawer member is inserted into one of the chambers 26 through each opening 28. The shorter leg 42 of the L-shaped rear wall 38 is slideably disposed on the upper surface of base 14 of housing 12 thereby permitting each drawer member 32 to slideably move in and out from one of the chambers 26 through one of the openings 28. The drawer member 32 is retained from complete removal from the chamber 26 by the shorter leg 42 engaging under the lip member 30.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An automobile tape storage case adapted to receive a plurality of tape cartridges or cassettes therein and to be mounted onto the automobile, which comprises:
   (a) a housing having a base, a pair of upwardly extending end walls, an upwardly extending rear wall, an open top, and an upwardly extending front wall having a plurality of openings therethrough;
   (b) a plurality of spaced intermediate walls disposed within said housing and aligned parallel to said end walls for forming a plurality of chambers with said housing, each said chamber communicating with one of said opening in said front wall;
   (c) a plurality of drawer members, each said drawer member slidably disposed in one of said chambers;
   (d) means for mounting said housing to said automobile;
   (e) means for retaining each said drawer within each said opening, each said drawer adapted to receive one tape cartridge or cassette therein and wherein each said drawer comprises:
   (f) an elongated base having a pair of ends;
   (g) a front wall extending perpendicularly upwardly from said forward end of said elongated base; and
   (h) an L-shaped rear wall having a longer and a shorter leg, said shorter leg being slidably disposed on an upper surface of said base, said rear end of said elongated base being perpendicularly affixed to an intermediate portion of said longer leg.

2. A case according to claim 1, wherein said mounting means further includes a plurality of tab members, said tab members affixed to upper and lower rear corners of each said end wall, each said tab member adapted to receive a screw means therethrough, each said screw means threadably received into said automobile.

3. A device according to claim 1, further including a handle member affixed to each said front wall of each said drawer.

4. A device according to claim 1, wherein each said drawer further includes a pair of sides.

5. A device according to claim 1, wherein said retaining means further includes a lip member affixed to an inner surface of said front wall of said housing and extending horizontally inward, said lip engaging said longer leg of said L-shaped rear wall of each said drawer as each said drawer moves outwardly from each said chamber through said corresponding opening.

* * * * *